United States Patent
Arakawa

(10) Patent No.: US 7,329,892 B2
(45) Date of Patent: Feb. 12, 2008

(54) RADIATION IMAGE ACQUIRING METHOD, APPARATUS, AND PROGRAM

(75) Inventor: Satoshi Arakawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/206,221

(22) Filed: Aug. 18, 2005

(65) Prior Publication Data

US 2006/0038146 A1    Feb. 23, 2006

(30) Foreign Application Priority Data

Aug. 20, 2004    (JP)    ............................. 2004-241002

(51) Int. Cl.
G03B 42/08    (2006.01)
(52) U.S. Cl. ...................... 250/586; 250/587
(58) Field of Classification Search ................ 250/587, 250/588, 586
See application file for complete search history.

(56) References Cited

U.S. PATENT DOCUMENTS 4,748,326 A    5/1988    Mori et al.

5,051,587 A *  9/1991   Hara et al. ................... 250/584

FOREIGN PATENT DOCUMENTS

JP    01274128 A    * 11/1989

* cited by examiner

*Primary Examiner*—Constantine Hannaher
(74) *Attorney, Agent, or Firm*—Sughrue Mion, PLLC

(57) ABSTRACT

Images are obtained with a reading device, such that an efficient pixel existence range of efficient pixels capable of being read out within a read-out sensitivity range of the reading device varies for different images, and such that the efficient pixel existence range in each image contains an overlapping area, which overlaps with the efficient pixel existence range in one of the other images. Correction processing is performed on the images, which have the common overlapping area, for correcting pixel values of pixels in at least either one of the images, such that the pixel values of the pixels in the overlapping area of one of the images become identical with the pixel values of the pixels in the overlapping area of the other image. A single image is composed from the images having been obtained from the correction processing.

3 Claims, 8 Drawing Sheets

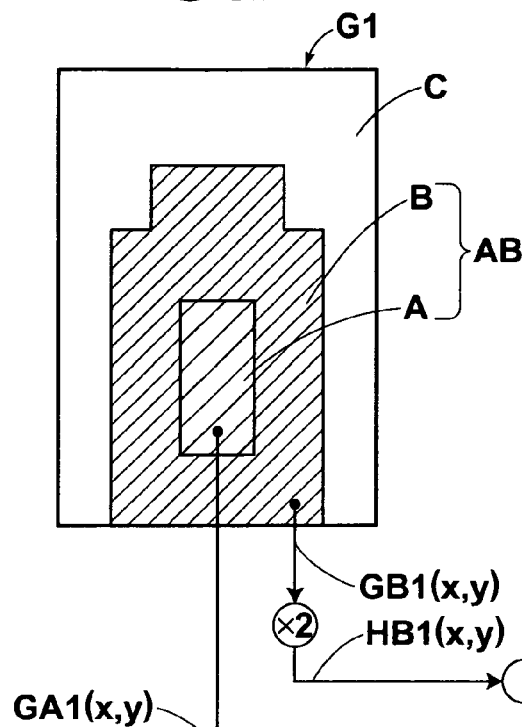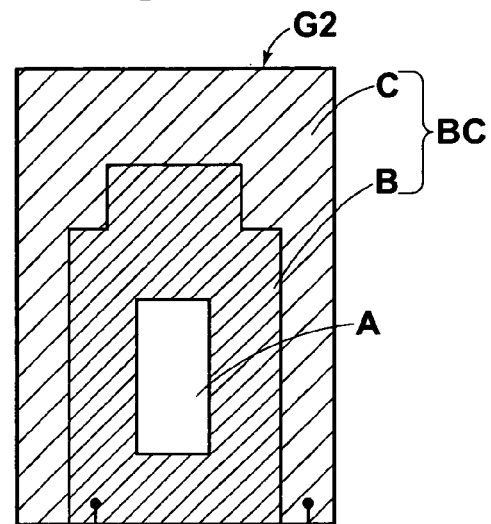

RADIATION IMAGE ACQUIRING METHOD, APPARATUS, AND PROGRAM

BACKGROUND OF THE INVENTION

1. Field of the Invention

This invention relates to a radiation image acquiring method and apparatus. This invention particularly relates to a radiation image acquiring method and apparatus, wherein composition processing is performed on a plurality of read-out images, each of which has been obtained from an image read-out operation for reading out an identical radiation image having been stored on a stimulable phosphor sheet, and a single composite image is thereby acquired. This invention also relates to a computer program for causing a computer to execute the radiation image acquiring method.

2. Description of the Related Art

Radiation image recording and reproducing systems utilizing stimulable phosphors have heretofore been known. With the radiation image recording and reproducing systems utilizing the stimulable phosphors, radiation carrying image information of an object, such as a human body, is irradiated to a sheet containing a stimulable phosphor (hereinbelow referred to as the stimulable phosphor sheet), and a radiation image of the object is thus stored on the stimulable phosphor sheet. The stimulable phosphor sheet, on which the radiation image has been stored, is then exposed to stimulating rays, such as a laser beam, which cause the stimulable phosphor sheet to emit light in proportion to the amount of energy stored on the stimulable phosphor sheet during the exposure of the stimulable phosphor sheet to the radiation. The light emitted by the stimulable phosphor sheet is photoelectrically detected, and an image signal representing the radiation image of the object is thereby acquired. A visible image is then reproduced from the image signal and utilized for a diagnosis of the object.

Also, there has been known a technique for acquiring a composite image. With the technique for acquiring a composite image, in cases where a radiation image having been stored on a stimulable phosphor sheet is to be read out, a beam diameter of the stimulating rays is set to be smaller than a size of each of pixels in the radiation image to be read out, and the identical radiation image having been stored on the stimulable phosphor sheet is scanned a plurality of times with the stimulating rays and is thus read out. A plurality of read-out images, which represent the identical radiation image having been stored on the stimulable phosphor sheet, are thereby obtained. The thus obtained read-out images are then combined with one another, and a composite image, which represents the radiation image having been stored on the stimulable phosphor sheet and which is free from noise components, is thereby acquired. The aforesaid technique for acquiring a composite image is described in, for example, U.S. Pat. No. 4,748,326.

A dynamic range of a radiation image having been stored on a stimulable phosphor sheet is at least $10^5$. Specifically, the dynamic range of the light intensity of the light, which is emitted by the stimulable phosphor sheet when the stimulable phosphor sheet is exposed to the stimulating rays having a predetermined intensity, and which represents the radiation image having been stored on the stimulable phosphor sheet, is at least $10^5$. However, in general, the dynamic range of a sensitivity of a photoelectric converter for detecting the light emitted by the stimulable phosphor sheet is approximately $10^4$. As a result, apart of the emitted light, which part has intensities corresponding to an approximately $10^1$ part of the dynamic range of $10^5$, falls outside a read-out sensitivity range of the photoelectric converter and is not capable of being detected appropriately. Therefore, there is a strong demand for a technique, with which the light emitted by the stimulable phosphor sheet is capable of being detected with a wide dynamic range, and with which an image representing a radiation image recorded with a wide radiation dose range is thus capable of being obtained.

SUMMARY OF THE INVENTION

The primary object of the present invention is to provide a radiation image acquiring method, wherein an image having good image quality, which image represents a radiation image having been stored on a stimulable phosphor sheet, is capable of being acquired.

Another object of the present invention is to provide an apparatus for carrying out the radiation image acquiring method.

The specific object of the present invention is to provide a computer program for causing a computer to execute the radiation image acquiring method.

The present invention provides a radiation image acquiring method, wherein composition processing is performed on a plurality of read-out images, each of which has been obtained from an image read-out operation performed by image read-out means for reading out an identical radiation image having been stored on a stimulable phosphor sheet, and wherein a single composite image, which represents the radiation image having been stored on the stimulable phosphor sheet, is thereby acquired, the method comprising the steps of:

i) performing the image read-out operation with the image read-out means for obtaining each of the read-out images, such that an efficient pixel existence range of efficient pixels, which are capable of being read out within a read-out sensitivity range of the image read-out means, varies for different read-out images, and such that the efficient pixel existence range in each of the read-out images contains an overlapping area, which overlaps with the efficient pixel existence range in one of the other read-out images, ii) performing correction processing on the read-out images, which have the common overlapping area, for correcting pixel values of pixels in at least either one of the read-out images, such that the pixel values of the pixels in the overlapping area of one of the read-out images become identical with the pixel values of the pixels in the overlapping area of the other read-out image, and iii) performing the composition processing for composing a single image from the read-out images, which have been obtained from the correction processing, whereby the composite image is acquired.

The present invention also provides a radiation image acquiring apparatus, comprising:

i) image read-out means for reading out a radiation image, which has been stored on a stimulable phosphor sheet, from the stimulable phosphor sheet, and ii) composite image acquiring means for performing composition processing on a plurality of read-out images, each of which has been obtained from an image read-out operation performed by the image read-out means and represents the identical radiation image having been stored on the stimulable phosphor sheet, and thereby acquiring a single composite image, which represents the radiation image having been stored on the stimulable phosphor sheet, wherein the image read-out means performs the image read-out operation for obtaining each of the read-out images, such that an efficient pixel existence range of efficient pixels, which are capable of being read out within a read-out sensitivity range of the image read-out means, varies for different read-out images, and such that the efficient pixel existence range in each of the read-out images contains an overlapping area, which overlaps with the efficient pixel existence range in one of the other read-out images, the composite image acquiring means performs correction processing on the read-out images, which have the common overlapping area, for correcting pixel values of pixels in at least either one of the read-out images, such that the pixel values of the pixels in the overlapping area of one of the read-out images become identical with the pixel values of the pixels in the overlapping area of the other read-out image, and the composite image acquiring means performs the composition processing for composing a single image from the read-out images, which have been obtained from the correction processing, whereby the composite image is acquired.

The present invention further provides a computer program for causing a computer to execute a radiation image acquiring method, wherein composition processing is performed on a plurality of read-out images, each of which has been obtained from an image read-out operation performed by image read-out means for reading out an identical radiation image having been stored on a stimulable phosphor sheet, and wherein a single composite image, which represents the radiation image having been stored on the stimulable phosphor sheet, is thereby formed, the computer program comprising the procedures for:

i) performing the image read-out operation with the image read-out means for obtaining each of the read-out images, such that an efficient pixel existence range of efficient pixels, which are capable of being read out within a read-out sensitivity range of the image read-out means, varies for different read-out images, and such that the efficient pixel existence range in each of the read-out images contains an overlapping area, which overlaps with the efficient pixel existence range in one of the other read-out images, ii) performing correction processing on the read-out images, which have the common overlapping area, for correcting pixel values of pixels in at least either one of the read-out images, such that the pixel values of the pixels in the overlapping area of one of the read-out images become identical with the pixel values of the pixels in the overlapping area of the other read-out image, and iii) performing the composition processing for composing a single image from the read-out images, which have been obtained from the correction processing, whereby the composite image is formed.

In each of the radiation image acquiring method, the radiation image acquiring apparatus, and the computer program in accordance with the present invention, the composition processing is performed such that the image equivalent to one image, which will be acquired with one time of an image read-out operation performed within a read-out sensitivity range having a dynamic range that is wider than the dynamic range of the aforesaid read-out sensitivity range of the image read-out means, may be obtained.

Also, the correction processing is performed on the read-out images, which have the common overlapping area, for correcting the pixel values of the pixels in at least either one of the read-out images, such that the pixel values of the pixels in the overlapping area of one of the read-out images become identical with the pixel values of the pixels in the overlapping area of the other read-out image. Specifically, the correction processing may be performed such that, with respect to every pixel in the overlapping area of each of the read-out images, the pixel values of the corresponding pixels representing an identical site in the overlapping area of one of the read-out images and those in the overlapping area of the other read-out image become exactly identical with each other. Alternatively, the correction processing may be performed such that the pixel values of the pixels in the overlapping area of one of the read-out images become substantially identical with the pixel values of the pixels in the overlapping area of the other read-out image.

For example, as a technique for performing the correction processing such that the pixel values of the pixels in the overlapping area of one of the read-out images become substantially identical with the pixel values of the pixels in the overlapping area of the other read-out image, there may be employed a technique, wherein the pixel values of the pixels in at least either one of the read-out images, which have the common overlapping area, are corrected such that a mean value of the pixel values of the pixels in the overlapping area of one of the read-out images becomes identical with the mean value of the pixel values of the pixels in the overlapping area of the other read-out image. Alternatively, for example, there may be employed a technique, wherein the pixel values of the pixels in at least either one of the read-out images are corrected such that a mode of the pixel values of the pixels in the overlapping area of one of the read-out images becomes identical with the mode of the pixel values of the pixels in the overlapping area of the other read-out image. As another alternative, for example, there may be employed a technique, wherein the pixel values of the pixels in at least either one of the read-out images are corrected such that a histogram, which is formed in accordance with the pixel values of the pixels in the overlapping area of one of the read-out images having the common overlapping area and in accordance with frequencies of occurrence of the pixels having the pixel values, becomes identical with the histogram, which is formed in accordance with the pixel values of the pixels in the overlapping area of the other read-out image having the common overlapping area and in accordance with the frequencies of occurrence of the pixels having the pixel values.

With respect to a pixel existence range of pixels, which have not been the efficient pixels in any of the read-out images having been obtained with the image read-out means, processing may be performed in the manner described below. Specifically, as for pixels, which have been read out above an upper limit of the read-out sensitivity range of the image read-out means, a maximum value of the values, which an image signal obtained with the image read-out means is capable of taking, may be taken as the pixel values of the pixels. Also, as for pixels, which have been read out below a lower limit of the read-out sensitivity range of the image read-out means, a minimum value of the values, which the image signal obtained with the image read-out means is capable of taking, may be taken as the pixel values of the pixels. With the processing described above, the composite image is capable of being acquired.

Further, the image read-out operation with the image read-out means for obtaining each of the read-out images is performed, such that the efficient pixel existence range of the efficient pixels, which are capable of being read out within the read-out sensitivity range of the image read-out means, varies for different read-out images. As a technique for performing the image read-out operation in the manner described above, for example, one of the techniques described below may be employed.

Specifically, for example, in cases where each of the read-out images, which represent the identical radiation image having been stored on the stimulable phosphor sheet, is to be obtained with the image read-out operation performed by the image read-out means, a plurality of times of image read-out operations may be performed on the stimulable phosphor sheet by use of the image read-out means, and one read-out image may be obtained with each of the image read-out operations. In this manner, the plurality of the read-out images, which represent the identical radiation image having been stored on the stimulable phosphor sheet, may be obtained.

In such cases, for example, it is possible to employ a technique wherein, instead of the read-out sensitivity range of the image read-out means being altered in each of the image read-out operations, radiation energy having been stored on the stimulable phosphor sheet is decayed uniformly at a stage between the image read-out operations, and wherein the next image read-out operation is performed with the image read-out means after the uniform decaying of the radiation energy. Alternatively, it is possible to employ a technique wherein, instead of the uniform decaying of the radiation energy at the stage between the image read-out operations being performed, the read-out sensitivity range of the image read-out means is altered for each of the image read-out operations. As another alternative, it is possible to employ a technique, wherein the read-out sensitivity range of the image read-out means is altered for each of the image read-out operations, wherein the radiation energy having been stored on the stimulable phosphor sheet is decayed uniformly at the stage between the image read-out operations, and wherein the next image read-out operation is performed with the image read-out means after the uniform decaying of the radiation energy.

The term "stage between image read-out operations" as used herein means the stage between a stage after each of sites on the stimulable phosphor sheet has been exposed to stimulating rays and has thus been caused by the stimulating rays to emit light in proportion to the amount of the stored radiation energy in the image read-out operation performed with the image read-out means and a stage before each of the sites on the stimulable phosphor sheet is exposed to the stimulating rays and is thus caused by the stimulating rays to emit light in proportion to the amount of the stored radiation energy in the next image read-out operation performed with the image read-out means.

In order for the radiation energy having been stored on the stimulable phosphor sheet to be decayed uniformly, for example, light having wavelengths falling within a visible light wavelength range, or the like, may be irradiated to the stimulable phosphor sheet such that the quantity of the irradiated light per unit area may be equal to a predetermined value, and the radiation energy having been stored on the stimulable phosphor sheet may thereby be decayed uniformly. In cases where the quantity of the decay of the radiation energy having been stored on the stimulable phosphor sheet, which decay is caused to occur by the irradiation of the stimulating rays, is equal to at least a predetermined quantity, the uniform decaying of the radiation energy in the aforesaid techniques for uniformly decaying the radiation energy is capable of being effected with the irradiation of the stimulating rays to the stimulable phosphor sheet at the time of the image read-out operation. In such cases, both the emission of the light from the stimulable phosphor sheet due to the irradiation of the stimulating rays and the decaying of the radiation energy having been stored on the stimulable phosphor sheet are capable of being performed simultaneously.

Furthermore, in cases where each of the read-out images, which represent the identical radiation image having been stored on the stimulable phosphor sheet, is to be obtained with the image read-out operation performed by the image read-out means, the image read-out operation may be performed one time on the stimulable phosphor sheet by use of the image read-out means, the direction of the optical path of the light, which has been emitted from an identical site on the stimulable phosphor sheet during the one time of the image read-out operation, may be branched into a plurality of different directions of optical paths, and one read-out image may be acquired with respect to each of the branched optical paths. In this manner, the plurality of the read-out images, which represent the identical radiation image having been stored on the stimulable phosphor sheet, may be acquired.

In such cases, for example, it is possible to employ a technique, wherein the image read-out operation is performed with the image read-out means, such that the intensity of the light, which has been emitted from the identical site on the stimulable phosphor sheet, has then been split, and thereafter travels along one of the branched optical paths, and the intensity of the light, which has been emitted from the identical site on the stimulable phosphor sheet and then travels along a different branched optical path, are identical with each other, and such that the read-out sensitivity range with respect to the light, which has traveled along one of the branched optical paths, and the read-out sensitivity range with respect to the light, which has traveled along a different branched optical path, are different from each other. Alternatively, it is possible to employ a technique, wherein the image read-out operation is performed with the image read-out means, such that the intensity of the light, which has been emitted from the identical site on the stimulable phosphor sheet, has then been split, and thereafter travels along one of the branched optical paths, and the intensity of the light, which has been emitted from the identical site on the stimulable phosphor sheet, has then been split, and thereafter travels along a different branched optical path, are different from each other, and such that the read-out sensitivity range with respect to the light, which has traveled along one of the branched optical paths, and the read-out sensitivity range with respect to the light, which has traveled along a different branched optical path, are identical with each other. As another alternative, it is possible to employ a technique, wherein the image read-out operation is performed with the image read-out means, such that the intensity of the light, which has been emitted from the identical site on the stimulable phosphor sheet, has then been split, and thereafter travels along one of the branched optical paths, and the intensity of the light, which has been emitted from the identical site on the stimulable phosphor sheet, has then been split, and thereafter travels along a different branched optical path, are different from each other, and such that the read-out sensitivity range with respect to the light, which has traveled along one of the branched optical paths, and the read-out sensitivity range with respect to the light, which has traveled along a different branched optical path, are different from each other.

The radiation image acquiring apparatus in accordance with the present invention may be modified such that the composite image acquiring means comprises:

a) pixel value correcting means for performing the correction processing on the read-out images, which have the common overlapping area, for correcting the pixel values of the pixels in at least either one of the read-out images by increasing or decreasing the pixel values of the pixels in at least either one of the read-out images as a whole, such that a mean value of the pixel values of the pixels in the overlapping area of one of the read-out images becomes identical with the mean value of the pixel values of the pixels in the overlapping area of the other read-out image, and b) image composing means for performing the composition processing for composing a single image from the read-out images, which have been obtained from the correction processing.

Alternatively, the radiation image acquiring apparatus in accordance with the present invention may be modified such that the composite image acquiring means comprises:

a) pixel value correcting means for performing the correction processing on the read-out images, which have the common overlapping area, for correcting the pixel values of the pixels in at least either one of the read-out images by increasing or decreasing the pixel values of the pixels in at least either one of the read-out images as a whole, such that a mode of the pixel values of the pixels in the overlapping area of one of the read-out images becomes identical with the mode of the pixel values of the pixels in the overlapping area of the other read-out image, and b) image composing means for performing the composition processing for composing a single image from the read-out images, which have been obtained from the correction processing.

The mode of the pixel values of the pixels in the overlapping area is the most frequent pixel value of the pixel values of the pixels in the overlapping area.

As another alternative, the radiation image acquiring apparatus in accordance with the present invention may be modified such that the composite image acquiring means comprises:

a) pixel value correcting means for performing the correction processing on the read-out images, which have the common overlapping area, for correcting the pixel values of the pixels in at least either one of the read-out images by increasing or decreasing the pixel values of the pixels in at least either one of the read-out images as a whole, such that a histogram, which is formed in accordance with the pixel values of the pixels in the overlapping area of one of the read-out images having the common overlapping area and in accordance with frequencies of occurrence of the pixels having the pixel values, becomes identical with the histogram, which is formed in accordance with the pixel values of the pixels in the overlapping area of the other read-out image having the common overlapping area and in accordance with the frequencies of occurrence of the pixels having the pixel values, and b) image composing means for performing the composition processing for composing a single image from the read-out images, which have been obtained from the correction processing.

As a further alternative, the radiation image acquiring apparatus in accordance with the present invention may be modified such that the composite image acquiring means comprises:

a) pixel value correcting means for performing the correction processing on the read-out images, which have the common overlapping area, for correcting the pixel values of the pixels in at least either one of the read-out images by increasing or decreasing the pixel values of the pixels in at least either one of the read-out images as a whole, such that the pixel values of the corresponding pixels representing an identical site in the overlapping area of one of the read-out images and the overlapping area of the other read-out image become identical with each other, and b) image composing means for performing the composition processing for composing a single image from the read-out images, which have been obtained from the correction processing.

The term "increasing or decreasing pixel values as a whole" as used herein means that the pixel values of the pixels in at least either one of the read-out images are altered as a whole, such that the relationship of the magnitudes of the pixel values of the pixels in the read-out image may not be reversed, and such that the pixel values of the efficient pixels in the read-out image may be altered in a single direction for each read-out image, i.e. in a direction that increases the pixel values or in a direction that decreases the pixel values.

Also, the radiation image acquiring apparatus in accordance with the present invention may be modified such that the image read-out means performs a plurality of times of image read-out operations on the stimulable phosphor sheet, obtains one read-out image with each of the image read-out operations, and thereby acquires the plurality of the read-out images, which represent the identical radiation image having been stored on the stimulable phosphor sheet, and the image read-out means comprises:

radiation energy decaying means for uniformly decaying radiation energy having been stored on the stimulable phosphor sheet, and control means for controlling the radiation energy decaying means, such that the decaying of the radiation energy with the radiation energy decaying means is performed at a stage between the plurality of times of the image read-out operations, which are performed by the image read-out means.

With each of the radiation image acquiring method, the radiation image acquiring apparatus, and the computer program for causing a computer to execute the radiation image acquiring method in accordance with the present invention, the image read-out operation is performed with the image read-out means for obtaining each of the read-out images, which represent the identical radiation image having been stored on the stimulable phosphor sheet. The image read-out operation is performed such that the efficient pixel existence range of the efficient pixels, which are capable of being read out within the read-out sensitivity range of the image read-out means, varies for different read-out images, and such that the efficient pixel existence range in each of the read-out images contains the overlapping area, which overlaps with the efficient pixel existence range in one of the other read-out images. Also, the correction processing is performed on the read-out images, which have the common overlapping area, for correcting the pixel values of the pixels in at least either one of the read-out images, such that the pixel values of the pixels in the overlapping area of one of the read-out images become identical with the pixel values of the pixels in the overlapping area of the other read-out image. Further, the composition processing is performed for composing the single image from the read-out images, which have been obtained from the correction processing, and the composite image is thereby acquired. Therefore, the image having good image quality, which image represents the radiation image having been stored on the stimulable phosphor sheet, is capable of being acquired.

Specifically, the pixel values of the pixels in the plurality of the read-out images, which have been obtained in the manner described above, are capable of containing image information of the radiation image having been stored on the stimulable phosphor sheet, which image information covers a dynamic range wider than the dynamic range of the image information represented by pixel values of pixels in only one read-out image having been read out within the read-out sensitivity range identical with the read-out sensitivity range of the image read-out means described above. Therefore, in cases where the plurality of the read-out images described above are combined with one another into the single image, the image having good image quality, which image represents the radiation image having been stored on the stimulable phosphor sheet, is capable of being acquired.

The radiation image acquiring apparatus in accordance with the present invention may be modified such that the composite image acquiring means comprises: (a) the pixel value correcting means for performing the correction processing on the read-out images, which have the common overlapping area, for correcting the pixel values of the pixels in at least either one of the read-out images by increasing or decreasing the pixel values of the pixels in at least either one of the read-out images as a whole, such that the mean value of the pixel values of the pixels in the overlapping area of one of the read-out images becomes identical with the mean value of the pixel values of the pixels in the overlapping area of the other read-out image and (b) the image composing means for performing the composition processing for composing the single image from the read-out images, which have been obtained from the correction processing. With the modification described above, the combining of the plurality of the read-out images with one another is capable of being performed more accurately.

Alternatively, the radiation image acquiring apparatus in accordance with the present invention may be modified such that the composite image acquiring means comprises: (a) the pixel value correcting means for performing the correction processing on the read-out images, which have the common overlapping area, for correcting the pixel values of the pixels in at least either one of the read-out images, by increasing or decreasing the pixel values of the pixels in at least either one of the read-out images as a whole, such that the mode of the pixel values of the pixels in the overlapping area of one of the read-out images becomes identical with the mode of the pixel values of the pixels in the overlapping area of the other read-out image and (b) the image composing means for performing the composition processing for composing the single image from the read-out images, which have been obtained from the correction processing. With the modification described above, the combining of the plurality of the read-out images with one another is capable of being performed more accurately.

As another alternative, the radiation image acquiring apparatus in accordance with the present invention may be modified such that the composite image acquiring means comprises: (a) the pixel value correcting means for performing the correction processing on the read-out images, which have the common overlapping area, for correcting the pixel values of the pixels in at least either one of the read-out images by increasing or decreasing the pixel values of the pixels in at least either one of the read-out images as a whole, such that the histogram, which is formed in accordance with the pixel values of the pixels in the overlapping area of one of the read-out images having the common overlapping area and in accordance with frequencies of occurrence of the pixels having the pixel values, becomes identical with the histogram, which is formed in accordance with the pixel values of the pixels in the overlapping area of the other read-out image having the common overlapping area and in accordance with the frequencies of occurrence of the pixels having the pixel values, and (b) the image composing means for performing the composition processing for composing the single image from the read-out images, which have been obtained from the correction processing. With the modification described above, the combining of the plurality of the read-out images with one another is capable of being performed more accurately.

As a further alternative, the radiation image acquiring apparatus in accordance with the present invention may be modified such that the composite image acquiring means comprises: (a) the pixel value correcting means for performing the correction processing on the read-out images, which have the common overlapping area, for correcting the pixel values of the pixels in at least either one of the read-out images by increasing or decreasing the pixel values of the pixels in at least either one of the read-out images as a whole, such that the pixel values of the corresponding pixels representing the identical site in the overlapping area of one of the read-out images and the overlapping area of the other read-out image become identical with each other, and (b) the image composing means for performing the composition processing for composing the single image from the read-out images, which have been obtained from the correction processing. With the modification described above, the combining of the plurality of the read-out images with one another is capable of being performed more accurately.

Also, the radiation image acquiring apparatus in accordance with the present invention may be modified such that the image read-out means performs the plurality of times of the image read-out operations on the stimulable phosphor sheet, obtains one read-out image with each of the image read-out operations, and thereby acquires the plurality of the read-out images, which represent the identical radiation image having been stored on the stimulable phosphor sheet, and the image read-out means comprises: the radiation energy decaying means for uniformly decaying radiation energy having been stored on the stimulable phosphor sheet, and the control means for controlling the radiation energy decaying means, such that the decaying of the radiation energy with the radiation energy decaying means is performed at the stage between the plurality of times of the image read-out operations, which are performed by the image read-out means. With the modification described above, the read-out sensitivity range of the image read-out means need not be altered, and the efficient pixel existence range of the efficient pixels, which are capable of being read out within the read-out sensitivity range of the image read-out means, is capable of being varied for different read-out images.

BRIEF DESCRIPTION OF THE DRAWINGS

FIG. 2A is an explanatory view showing a read-out image G1, which has been obtained with a first image read-out operation performed by image read-out means and represents a radiation image having been stored on a stimulable phosphor sheet, FIG. 2B is an explanatory view showing a read-out image G2, which has been obtained with a second image read-out operation performed by the image read-out means and represents the identical radiation image having been stored on the stimulable phosphor sheet, FIG. 2C is an explanatory view showing a composite image GG, which has been obtained from composition processing performed on read-out images having been obtained from correction processing for correcting pixel values of pixels in the read-out image G1 and the read-out image G2.

DESCRIPTION OF THE PREFERRED EMBODIMENTS

The present invention will hereinbelow be described in further detail with reference to the accompanying drawings.

Figure 1:
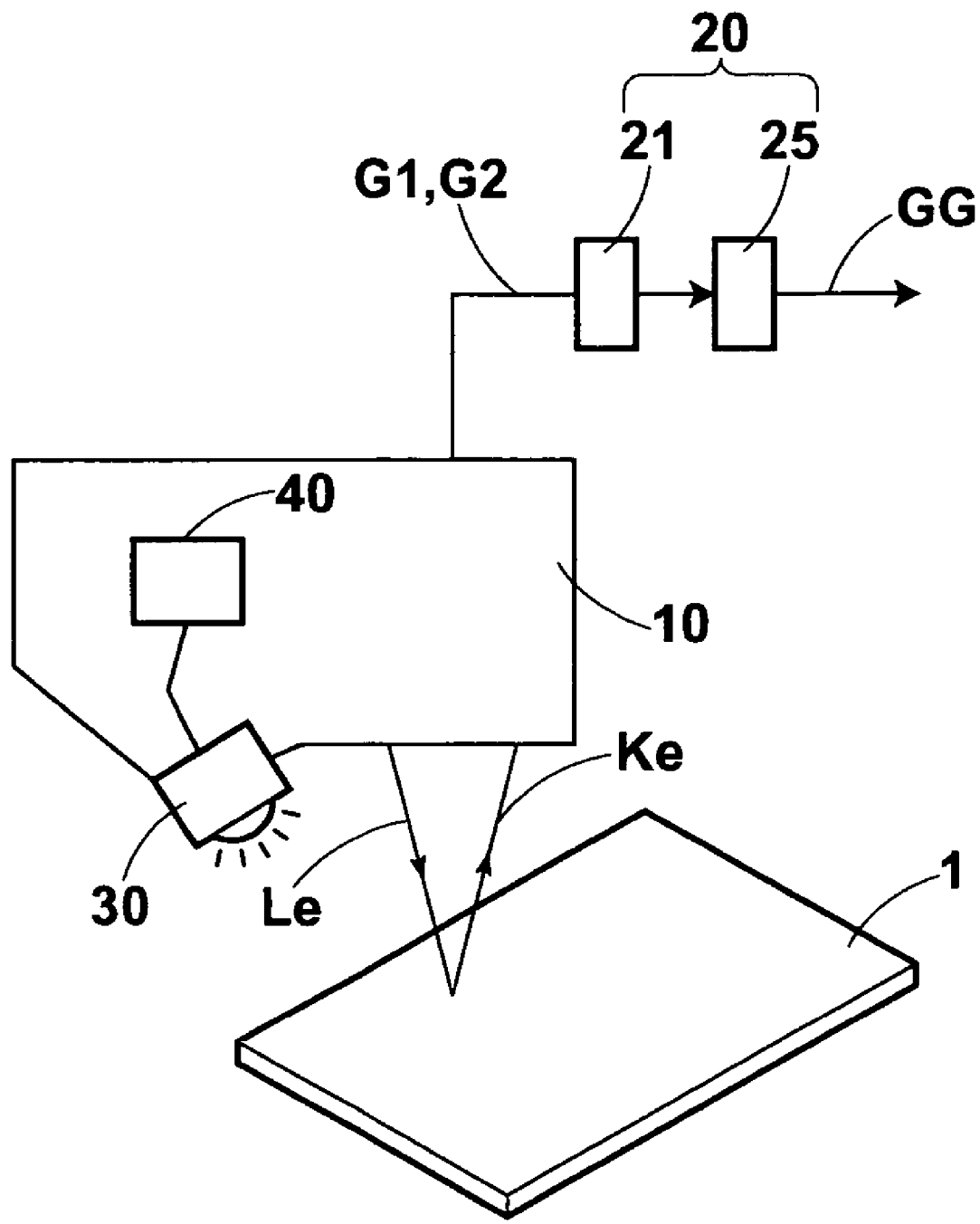
FIG. 1 is a schematic view showing an embodiment of the radiation image acquiring apparatus in accordance with the present invention.

FIG. 1 is a schematic view showing an embodiment of the radiation image acquiring apparatus in accordance with the present invention. With reference to FIG. 1, the embodiment of the radiation image acquiring apparatus in accordance with the present invention comprises image read-out means 10 for reading out a radiation image, which has been stored on a stimulable phosphor sheet 1, from the stimulable phosphor sheet 1. The embodiment of the radiation image acquiring apparatus also comprises composite image acquiring means 20 for performing composition processing on a plurality of read-out images (in this case, a read-out image G1 and a read-out image G2), each of which has been obtained from an image read-out operation performed by the image read-out means 10 and represents the identical radiation image having been stored on the stimulable phosphor sheet 1, and thereby acquiring a single composite image GG, which represents the radiation image having been stored on the stimulable phosphor sheet 1.

The image read-out means 10 performs the image read-out operation for obtaining each of the read-out image G1 and the read-out image G2, which represent the identical radiation image having been stored on the stimulable phosphor sheet 1, such that an efficient pixel existence range of efficient pixels, which are capable of being read out within a read-out sensitivity range of the image read-out means 10, varies for the read-out image G1 and the read-out image G2, and such that the efficient pixel existence range in one of the read-out image G1 and the read-out image G2 contains an overlapping area, which overlaps with the efficient pixel existence range in the other read-out image.

The composite image acquiring means 20 performs processing by use of efficient pixels in each of the read-out image G1 and the read-out image G2, which have been obtained with the image read-out means 10. Specifically, the composite image acquiring means 20 performs correction processing on the read-out image G1 and the read-out image G2, which have the common overlapping area, for correcting pixel values of the pixels in at least either one of the read-out image G1 and the read-out image G2, such that the pixel values of the pixels in the overlapping area of one of the read-out image G1 and the read-out image G2 become identical with the pixel values of the pixels in the overlapping area of the other read-out image. Also, the composite image acquiring means 20 performs the composition processing for composing the single composite image GG from the read-out images, which have been obtained from the correction processing, and thereby acquires the composite image GG. The composite image acquiring means 20 comprises pixel value correcting means 21 for performing the correction processing on the read-out image G1 and the read-out image G2 for correcting the pixel values of the pixels in at least either one of the read-out image G1 and the read-out image G2 by increasing or decreasing the pixel values of the pixels in at least either one of the read-out image G1 and the read-out image G2 as a whole. The composite image acquiring means 20 also comprises image composing means 25 for performing the composition processing for composing the single composite image GG from the read-out images, which have been obtained from the correction processing.

The pixel value correcting means 21 may perform the correction processing on the read-out image G1 and the read-out image G2, which have the common overlapping area, for correcting the pixel values of the pixels in at least either one of the read-out image G1 and the read-out image G2 by increasing or decreasing the pixel values of the pixels in at least either one of the read-out image G1 and the read-out image G2 as a whole, such that a mean value of the pixel values of the pixels in the overlapping area of one of the read-out image G1 and the read-out image G2 becomes identical with the mean value of the pixel values of the pixels in the overlapping area of the other read-out image.

Alternatively, the pixel value correcting means 21 may perform the correction processing on the read-out image G1 and the read-out image G2, which have the common overlapping area, for correcting the pixel values of the pixels in at least either one of the read-out image G1 and the read-out image G2 by increasing or decreasing the pixel values of the pixels in at least either one of the read-out image G1 and the read-out image G2 as a whole, such that a mode of the pixel values of the pixels in the overlapping area of one of the read-out image G1 and the read-out image G2 becomes identical with the mode of the pixel values of the pixels in the overlapping area of the other read-out image.

As another alternative, the pixel value correcting means 21 may perform the correction processing on the read-out image G1 and the read-out image G2 for correcting the pixel values of the pixels in at least either one of the read-out image G1 and the read-out image G2 by increasing or decreasing the pixel values of the pixels in at least either one of the read-out image G1 and the read-out image G2 as a whole, such that a histogram, which is formed in accordance with the pixel values of the pixels in the overlapping area of one of the read-out image G1 and the read-out image G2 having the common overlapping area and in accordance with frequencies of occurrence of the pixels having the pixel values, becomes identical with the histogram, which is formed in accordance with the pixel values of the pixels in the overlapping area of the other read-out image having the common overlapping area and in accordance with the frequencies of occurrence of the pixels having the pixel values.

As a further alternative, pixel value correcting means 21 may perform the correction processing on the read-out image G1 and the read-out image G2, which have the common overlapping area, for correcting the pixel values of the pixels in at least either one of the read-out image G1 and the read-out image G2 by increasing or decreasing the pixel values of the pixels in at least either one of the read-out image G1 and the read-out image G2 as a whole, such that the pixel values of the corresponding pixels representing an identical site in the overlapping area of one of the read-out image G1 and the read-out image G2 and the overlapping area of the other read-out image become identical with each other.

In the embodiment of FIG. 1, the image read-out means 10 performs a plurality of times (in this case, two times) of image read-out operations on the stimulable phosphor sheet 1 and obtains one read-out image with each of the image read-out operations. In this manner, the image read-out means 10 acquires the plurality of the read-out images (in this case, the read-out image G1 and the read-out image G2), which represent the identical radiation image having been stored on the stimulable phosphor sheet 1.

The image read-out means 10 comprises radiation energy decaying means 30 for uniformly decaying radiation energy having been stored on the stimulable phosphor sheet 1. The image read-out means 10 also comprises control means 40 for controlling the radiation energy decaying means 30, such that the decaying of the radiation energy with the radiation energy decaying means 30 is performed at a stage between the plurality of times of the image read-out operations, which are performed by the image read-out means 10.

In this embodiment, the read-out sensitivity range of the image read-out means 10 is the sensitivity range, in which a detecting section of the image read-out means 10 is capable of detecting emitted light Ke having been emitted by the stimulable phosphor sheet 1 when the stimulable phosphor sheet 1 is exposed to stimulating rays Le, such that the detecting operation may not fall above an upper limit of a light detectable range or such that the detecting operation may not fall below a lower limit of a light detectable range.

How the image composition is performed in this embodiment will be described hereinbelow.

Figure 3A:
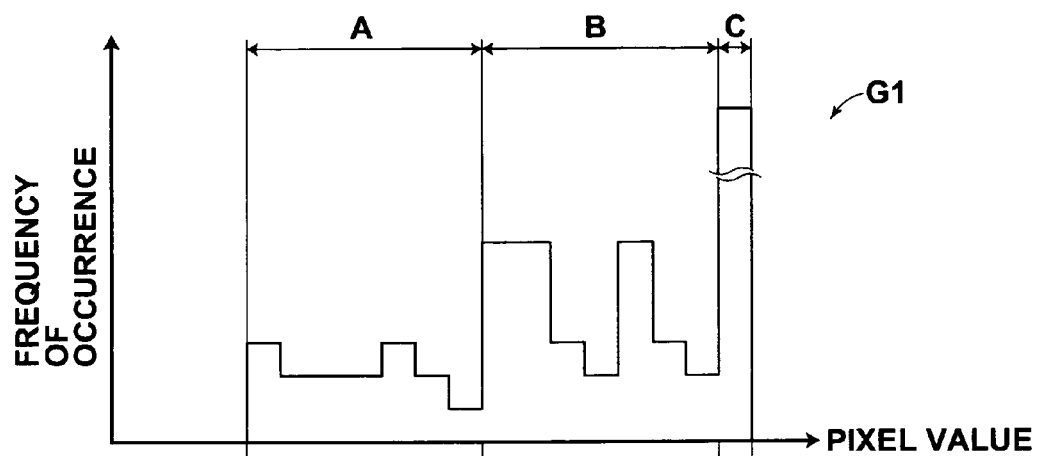
FIG. 3A is a graph showing a histogram of the read-out image G1, which has been obtained with the first image read-out operation performed by the image read-out means.
Figure 3B:
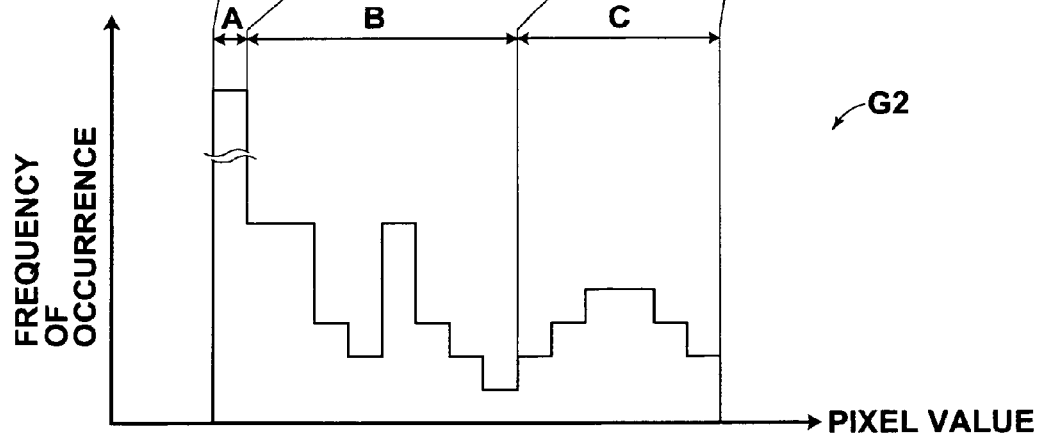
FIG. 3B is a graph showing a histogram of the read-out image G2, which has been obtained with the second image read-out operation performed by the image read-out means.
Figure 4A:
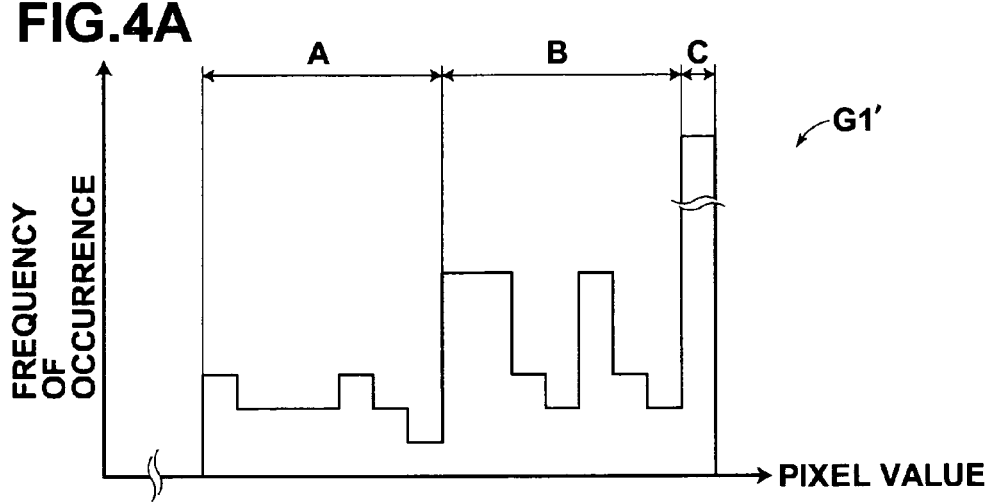
FIG. 4A is a graph showing a histogram of a read-out image G1', which has been obtained from correction processing for correcting pixel values of pixels in the read-out image G1.
Figure 4B:
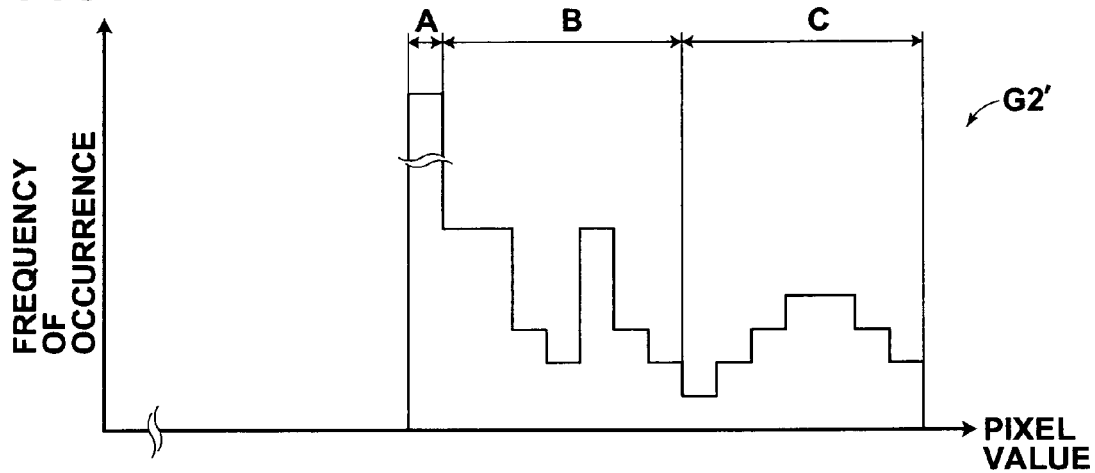
FIG. 4B is a graph showing a histogram of a read-out image G2', which has been obtained from correction processing for correcting pixel values of pixels in the read-out image G2.
Figure 4C:
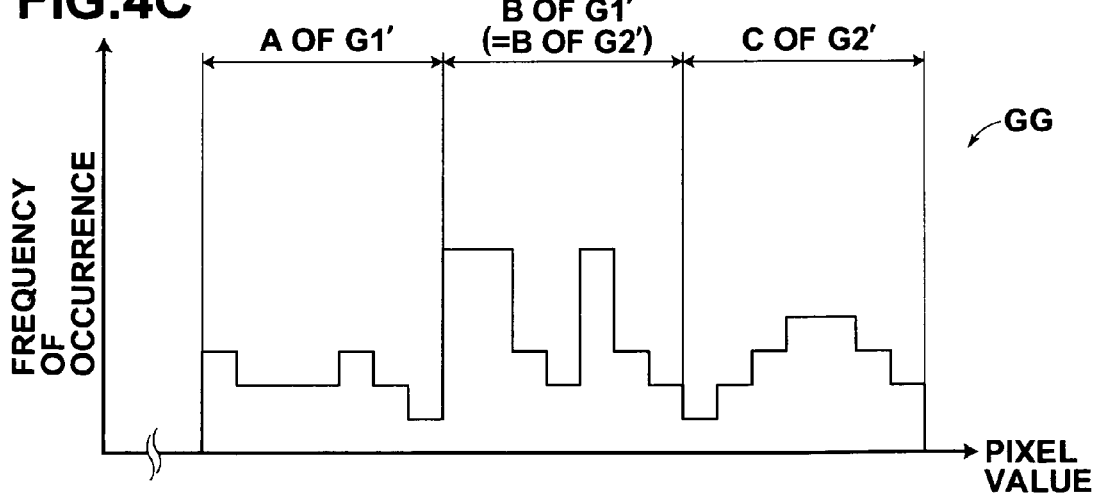
FIG. 4C is a graph showing a histogram of the composite image GG, which has been obtained from composition processing performed on the read-out image G1' and the read-out image G2'.

FIG. 2A is an explanatory view showing the read-out image G1, which has been obtained with a first image read-out operation performed by the image read-out means 10 and represents the radiation image having been stored on the stimulable phosphor sheet 1. FIG. 2B is an explanatory view showing the read-out image G2, which has been obtained with a second image read-out operation performed by the image read-out means 10 and represents the identical radiation image having been stored on the stimulable phosphor sheet 1. FIG. 2C is an explanatory view showing the composite image GG, which has been obtained from the composition processing performed on read-out images having been obtained from correction processing for correcting pixel values of pixels in the read-out image G1 and the read-out image G2. FIG. 3A is a graph showing a histogram of the read-out image G1, which has been obtained with the first image read-out operation performed by the image read-out means 10. FIG. 3B is a graph showing a histogram of the read-out image G2, which has been obtained with the second image read-out operation performed by the image read-out means 10. FIG. 4A is a graph showing a histogram of a read-out image G1', which has been obtained from the correction processing for correcting pixel values of pixels in the read-out image G1. FIG. 4B is a graph showing a histogram of a read-out image G2', which has been obtained from the correction processing for correcting pixel values of pixels in the read-out image G2. FIG. 4C is a graph showing a histogram of the composite image GG, which has been obtained from the composition processing performed on the read-out image G1' and the read-out image G2'.

Firstly, the first image read-out operation is performed by the image read-out means 10 and on the stimulable phosphor sheet 1, on which the radiation image has been stored. With the first image read-out operation, the read-out image G1, which represents the radiation image having been stored on the stimulable phosphor sheet 1, is obtained. As illustrated in FIG. 2A, the read-out image G1 contains a pixel existence range A and a pixel existence range B. Each of the pixel existence range A and the pixel existence range B contained in the read-out image G1 is the efficient pixel existence range of the efficient pixels, which have been read out within the read-out sensitivity range of the image read-out means 10. The read-out image G1 also contains a pixel existence range C. The pixel existence range C contained in the read-out image G1 is the existence range of the pixels, which have been read out outside the read-out sensitivity range of the image read-out means 10.

Specifically, the emitted light Ke having been emitted from each of the pixels on the stimulable phosphor sheet 1, which pixels correspond to the efficient pixels constituting the efficient pixel existence range A and the efficient pixel existence range B contained in the read-out image G1, has been detected within the read-out sensitivity range of the image read-out means 10. Also, the emitted light Ke having been emitted from each of the pixels on the stimulable phosphor sheet 1, which pixels correspond to the pixels constituting the pixel existence range C contained in the read-out image G1, has been detected above the upper limit of the read-out sensitivity range of the image read-out means 10.

After the first image read-out operation has been performed by the image read-out means 10 and on the stimulable phosphor sheet 1, on which the radiation image has been stored, the control means 40 controls the radiation energy decaying means 30, such that the radiation energy decaying means 30 performs an operation for uniformly decaying the radiation energy, which has been stored on the stimulable phosphor sheet 1.

Thereafter, the image read-out means 10 performs the second image read-out operation on the stimulable phosphor sheet 1, which has been subjected to the operation for uniformly decaying the radiation energy. With the second image read-out operation, the read-out image G2, which represents the identical radiation image having been stored on the stimulable phosphor sheet 1, is obtained. As illustrated in FIG. 2B, the pixels constituting the pixel existence range C, which pixels were read out outside the read-out sensitivity range of the image read-out means 10 in the aforesaid first image read-out operation, are capable of being read out within the read-out sensitivity range. Specifically, since the stimulable phosphor sheet 1 has been subjected to the aforesaid operation for uniformly decaying the radiation energy, it becomes possible that the emitted light Ke having been emitted from each of the pixels on the stimulable phosphor sheet 1, which pixels correspond to the pixels constituting the pixel existence range C, is detected within the read-out sensitivity range of the image read-out means 10.

However, during the second image read-out operation, the pixels, which constitute the pixel existence range A and which were read out within the read-out sensitivity range of the image read-out means 10, are read out outside the read-out sensitivity range of the image read-out means 10. Specifically, since the stimulable phosphor sheet 1 has been subjected to the aforesaid operation for uniformly decaying the radiation energy, the emitted light Ke having been emitted from each of the pixels on the stimulable phosphor sheet 1, which pixels correspond to the pixels constituting the pixel existence range A, is detected below the lower limit of the read-out sensitivity range of the image read-out means 10.

As in the cases of the pixel existence range B contained in the read-out image G1, which has been acquired with the first image read-out operation, the pixels constituting the pixel existence range B contained in the read-out image G2, which has been read out with the second image read-out operation, are read out within the read-out sensitivity range of the image read-out means 10. Specifically, due to the aforesaid operation for uniformly decaying the radiation energy, the energy level of the radiation energy having been stored at the pixels on the stimulable phosphor sheet 1 at the time of the second image read-out operation, which pixels correspond to the pixels constituting the pixel existence range B in the read-out image G2 having been obtained with the second image read-out operation, has become lower than the energy level of the radiation energy having been stored at the pixels on the stimulable phosphor sheet 1 at the time of the first image read-out operation. However, at the time of the second image read-out operation, the emitted light Ke having been emitted from the aforesaid pixels on the stimulable phosphor sheet 1, which pixels correspond to the pixels constituting the pixel existence range B in the read-out image G2, is detected within the read-out sensitivity range of the image read-out means 10.

Therefore, as illustrated in FIG. 2A, the efficient pixel existence range of the efficient pixels, which have been read out within the read-out sensitivity range of the image read-out means 10 during the first image read-out operation, is an efficient pixel existence range AB, which is constituted of the pixel existence range A and the pixel existence range B contained in the read-out image G1. Also, as illustrated in FIG. 2B, the efficient pixel existence range of the efficient pixels, which have been read out within the read-out sensitivity range of the image read-out means 10 during the second image read-out operation, is an efficient pixel existence range BC, which is constituted of the pixel existence range B and the pixel existence range C contained in the read-out image G2. The efficient pixel existence range of the efficient pixels, which are capable of being read out within the read-out sensitivity range of the image read-out means 10, varies for the read-out image G1 and the read-out image G2. Also, each of the efficient pixel existence range AB in the read-out image G1 and the efficient pixel existence range BC in the read-out image G2 contains an overlapping area (in this case, the pixel existence range B), which overlaps with the efficient pixel existence range in the other read-out image.

The pixels constituting the pixel existence range C contained in the read-out image G1 have been detected above the upper limit of the read-out sensitivity range of the image read-out means 10. Therefore, as indicated by the histogram of FIG. 3A, the frequencies of occurrence of the pixels contained in the pixel existence range C of the read-out image G1 are centralized upon a single same value. Also, the pixels constituting the pixel existence range A contained in the read-out image G2 have been detected below the lower limit of the read-out sensitivity range of the image read-out means 10. Therefore, as indicated by the histogram of FIG. 3B, the frequencies of occurrence of the pixels contained in the pixel existence range A of the read-out image G2 are centralized upon a single same value.

In the manner described above, the read-out image G1 and the read-out image G2 are obtained with the first and second image read-out operations, such that each of the efficient pixel existence range AB in the read-out image G1 and the efficient pixel existence range BC in the read-out image G2 contains the overlapping area (in this case, the pixel existence range B), which overlaps with the efficient pixel existence range in the other read-out image. Thereafter, in this embodiment, the pixel value correcting means 21 performs the correction processing on the read-out image G1 and the read-out image G2, which have the common overlapping area, for correcting the pixel values of the pixels in the read-out image G1 and the read-out image G2, by increasing or decreasing the pixel values of the pixels in each of the read-out image G1 and the read-out image G2 as a whole, such that a mean value M1 of the pixel values of the pixels in the pixel existence range B acting as the overlapping area of the read-out image G1 becomes identical with a mean value M2 of the pixel values of the pixels in the pixel existence range B acting as the overlapping area of the read-out image G2.

The read-out image G1 having been obtained with the first image read-out operation will hereinbelow be often referred to as the first read-out image G1. Also, the read-out image G2 having been obtained with the second image read-out operation will hereinbelow be often referred to as the second read-out image G2.

The correction processing for correcting the pixel values of the pixels in the first read-out image G1 and the second read-out image G2 may be performed in the manner described below. For example, in cases where the mean value M1 of the pixel values of pixels GB1($x, y$) constituting the pixel existence range B contained in the first read-out image G1 is equal to 0.5, and the mean value M2 of the pixel values of pixels GB2(x, y) constituting the pixel existence range B contained in the second read-out image G2 is equal to 0.2, the pixel value of every pixel in the first read-out image G1 having been obtained with the first image read-out operation is multiplied by a value of 2, and the pixel value of every pixel in the second read-out image G2 having been obtained with the second image read-out operation is multiplied by a value of 5. In this manner, the correction processing for correcting the pixel values of the pixels is performed. With the correction processing, as illustrated in FIG. 4A, a read-out image G1' is obtained from the first read-out image G1. Also, as illustrated in FIG. 4B, a read-out image G2' is obtained from the second read-out image G2. As a result, the mean value of the pixel values of corrected pixels HB1(x, y) constituting the pixel existence range B in the read-out image G1', which has been obtained from the correction processing performed on the first read-out image G1, becomes equal to 1. Also, the mean value of the pixel values of corrected pixels HB2(x, y) constituting the pixel existence range B in the read-out image G2', which has been obtained from the correction processing performed on the second read-out image G2, becomes equal to 1.

Alternatively, the correction processing for correcting the pixel values of the pixels in the first read-out image G1 and the second read-out image G2 may be performed such that the pixel value of every pixel in the first read-out image G1 having been obtained with the first image read-out operation is not altered, and the pixel value of every pixel in the second read-out image G2 having been obtained with the second image read-out operation is multiplied by a value of 2.5. In such cases, the mean value of the pixel values of the corrected pixels constituting the pixel existence range B in the read-out image, which has been obtained from the correction processing performed on the first read-out image G1, is equal to 0.5. Also, the mean value of the pixel values of the corrected pixels constituting the pixel existence range B in the read-out image, which has been obtained from the correction processing performed on the second read-out image G2, becomes equal to 0.5.

Thereafter, as illustrated in FIG. 2C and FIG. 4C, the image composing means 25 performs the composition processing on the read-out image G1', which has been obtained from the correction processing performed on the first read-out image G1, and the read-out image G2', which has been obtained from the correction processing performed on the second read-out image G2. The composition processing is performed by use of the pixel values of the corrected pixels constituting the pixel existence range A and the pixel existence range B in the read-out image G1', which has been obtained from the correction processing performed on the first read-out image G1, and by use of the pixel values of the corrected pixels constituting the pixel existence range B and the pixel existence range C in the read-out image G2', which has been obtained from the correction processing performed on the second read-out image G2. With the composition processing, the composite image GG is obtained.

Specifically, as illustrated in FIG. 2C and FIG. 4C, the pixel values of corrected pixels HA1(x, y) constituting the pixel existence range A in the read-out image G1', which has been obtained from the correction processing performed on the first read-out image G1, are employed as the pixel values of the pixels constituting the pixel existence range A in the composite image GG. Also, the pixel values of corrected pixels HC2(x, y) constituting the pixel existence range C in the read-out image G2', which has been obtained from the correction processing performed on the second read-out image G2, are employed as the pixel values of the pixels constituting the pixel existence range C in the composite image GG. Further, an arithmetic mean calculating operation is performed on the pixel value of each corrected pixel HB1(x, y) constituting the pixel existence range B in the read-out image G1' having been obtained from the correction processing performed on the first read-out image G1 and the pixel value of each corrected pixel HB2(x, y) constituting the pixel existence range B in the read-out image G2' having been obtained from the correction processing performed on the second read-out image G2, which corrected pixels correspond to an identical site in the read-out image G1 and the read-out image G2'. The pixel values obtained from the arithmetic mean calculating operation are employed as the pixel values of the pixels constituting the pixel existence range B in the composite image GG.

In this embodiment, as described above, the correction processing for correcting the pixel values of the pixels with the pixel value correcting means 21 is performed such that the mean value of the pixel values of the pixels, which constitute the pixel existence range B contained in the first read-out image G1, and the mean value of the pixel values of the pixels, which constitute the pixel existence range B contained in the second read-out image G2, become identical with each other. Alternatively, the correction processing for correcting the pixel values of the pixels with the pixel value correcting means 21 may be performed such that the mode of the pixel values of the pixels, which constitute the pixel existence range B contained in the read-out image G1, and the mode of the pixel values of the pixels, which constitute the pixel existence range B contained in the second read-out image G2, become identical with each other.

Specifically, for example, the mode of the pixel values of the pixels GB1(x, y), which constitute the pixel existence range B contained in the first read-out image G1, may be equal to 0.5 with a frequency of occurrence of 7 times. Also, for example, the mode of the pixel values of the pixels GB2(x, y), which constitute the pixel existence range B contained in the second read-out image G2, may be equal to 0.2 with a frequency of occurrence of 7 times. In such cases, such that the two modes described above may become equal to each other, the pixel value of every pixel in the first read-out image G1 having been obtained with the first image read-out operation may be multiplied by a value of 2, and the pixel value of every pixel in the second read-out image G2 having been obtained with the second image read-out operation may be multiplied by a value of 5. In this manner, the correction processing for correcting the pixel values of the pixels may be performed. As a result, the mode of the pixel values of the corrected pixels HB1(x, y) constituting the pixel existence range B in the read-out image, which has been obtained from the correction processing performed on the first read-out image G1, becomes equal to 1. Also, the mode of the pixel values of the corrected pixels HB2(x, y) constituting the pixel existence range B in the read-out image, which has been obtained from the correction processing performed on the second read-out image G2, becomes equal to 1.

Each of the pixels, which have the mode of 0.5 with the frequency of occurrence of 7 times in the pixel existence range B contained in the first read-out image G1, and each of the pixels, which have the mode of 0.2 with the frequency of occurrence of 7 times in the pixel existence range B contained in the second read-out image G2, correspond to an identical site in the first read-out image G1 and the second read-out image G2.

As another alternative, the correction processing for correcting the pixel values of the pixels with the pixel value correcting means 21 may be performed in the manner described below. Specifically, the pixel values of the pixels in at least either one of the first read-out image G1 and the second read-out image G2, which have the common overlapping area of the efficient pixel existence range, may be corrected by increasing or decreasing the pixel values of the pixels in at least either one of the first read-out image G1 and the second read-out image G2 as a whole, such that the histogram, which is formed in accordance with the pixel values of the pixels constituting the pixel existence range B of the read-out image G1 and in accordance with frequencies of occurrence of the pixels having the pixel values, becomes identical with the histogram, which is formed in accordance with the pixel values of the pixels constituting the pixel existence range B of the second read-out image G2 and in accordance with the frequencies of occurrence of the pixels having the pixel values.

Figure 5A:
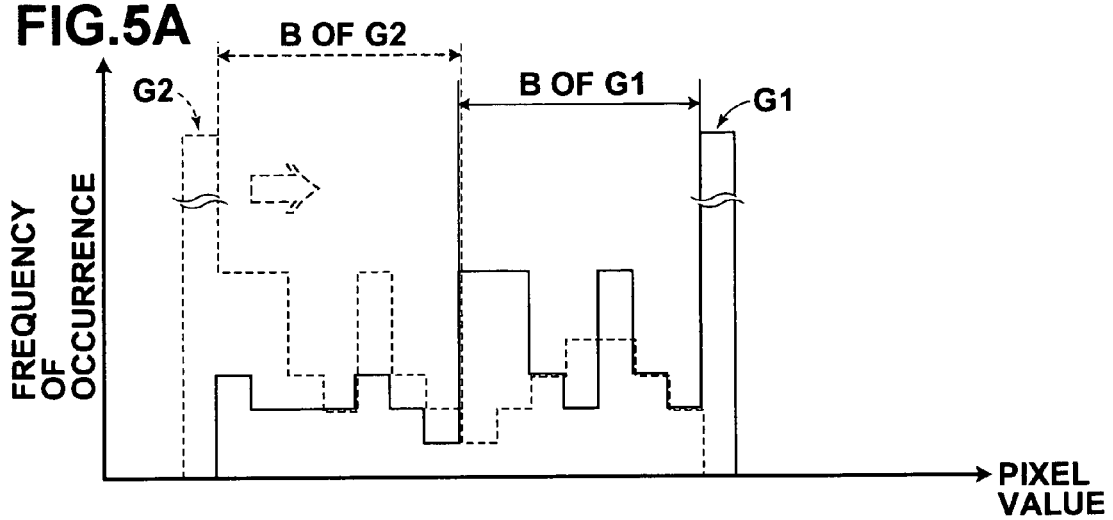
FIGS. 5A, 5B, and 5C are explanatory graphs showing how a magnifying rate for the pixel values of the pixels in the read-out image G2 is acquired, which magnifying rate is to be set in cases where the pixel values of the pixels in the read-out image G2 are to be corrected with processing for shifting the histogram of the read-out image G2 in a direction that increases the pixel values on a coordinate system defined by the pixel values and frequencies of occurrence of the pixels having the pixel values.
Figure 5B:
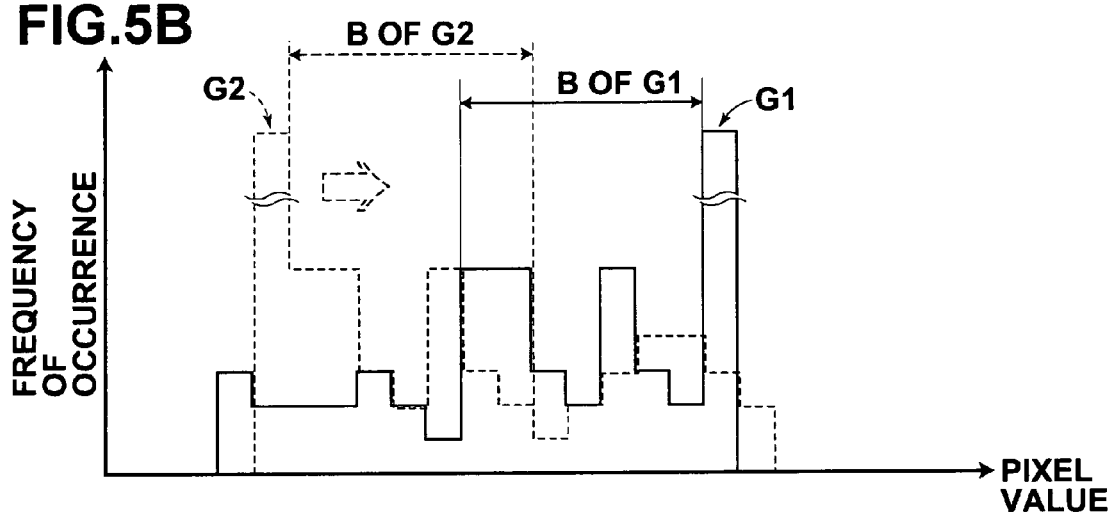
Figure 5C:
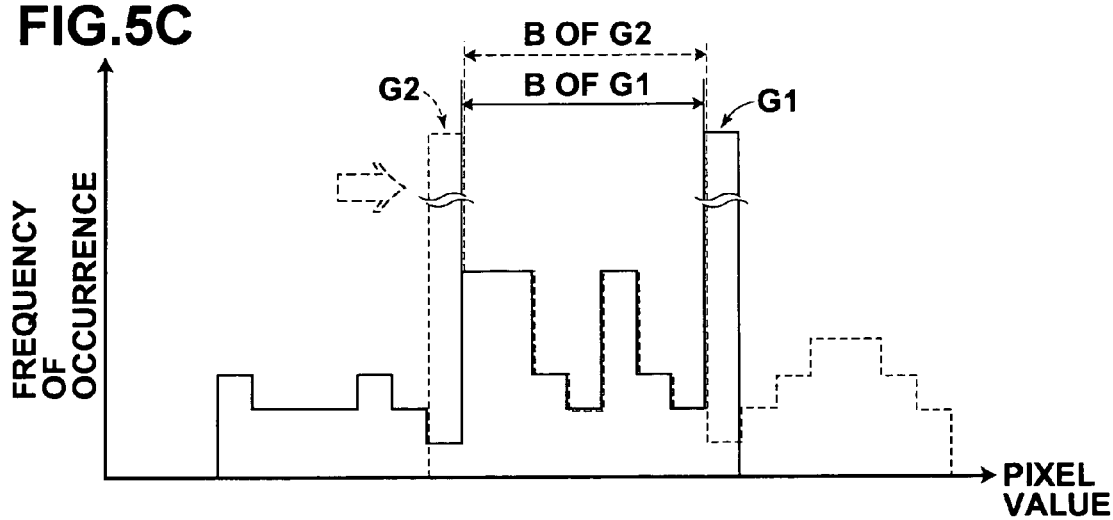

FIGS. 5A, 5B, and 5C are explanatory graphs showing how a magnifying rate for the pixel values of the pixels in the second read-out image G2 is acquired, which magnifying rate is to be set in cases where the pixel values of the pixels in the second read-out image G2 are to be corrected with processing for shifting the histogram of the second read-out image G2 in a direction that increases the pixel values on a coordinate system defined by the pixel values and frequencies of occurrence of the pixels having the pixel values.

As illustrated in FIGS. 5A, 5B, and 5C, by way of example, the histogram of the second read-out image G2 may be shifted as a whole in the direction of the coordinate axis representing the pixel values, and part, at which the contour of the histogram of the second read-out image G2 overlaps upon the contour of the histogram of the first read-out image G1, may thus be found. In this manner, it is possible to acquire the magnifying rate for the pixel values of the pixels in the second read-out image G2, which magnifying rate is to be set in cases where the pixel values of the pixels in the second read-out image G2 are to be corrected.

As described above, with the embodiment of the radiation image acquiring apparatus in accordance with the present invention, the composite image GG, which represents the radiation image having been stored on the stimulable phosphor sheet 1, is capable of being acquired with a wide dynamic range. Specifically, as illustrated in FIG. 4C, the composite image GG constituted of the pixels, which are contained in the efficient pixel existence range AB of the read-out image G1' having been obtained from the correction processing performed on the first read-out image G1, and the pixels, which are contained in the efficient pixel existence range BC of the read-out image G2' having been obtained from the correction processing performed on the second read-out image G2, is capable of containing the image information of the radiation image having been stored on the stimulable phosphor sheet 1, which image information has the dynamic range wider than the dynamic range of a single image having been read out within the read-out sensitivity range of the image read-out means 10.

In the embodiment described above, one composite image GG is formed with the composition processing performed by use of the two read-out images G1 and G2, each of which has been obtained with one of the two image read-out operations and represents the identical radiation image having been stored on the stimulable phosphor sheet 1. Alternatively, one composite image may be formed with the composition processing performed by use of at least three read-out images, each of which has been obtained with one of at least three image read-out operations and represents the identical radiation image having been stored on the stimulable phosphor sheet 1.

Figure 6:
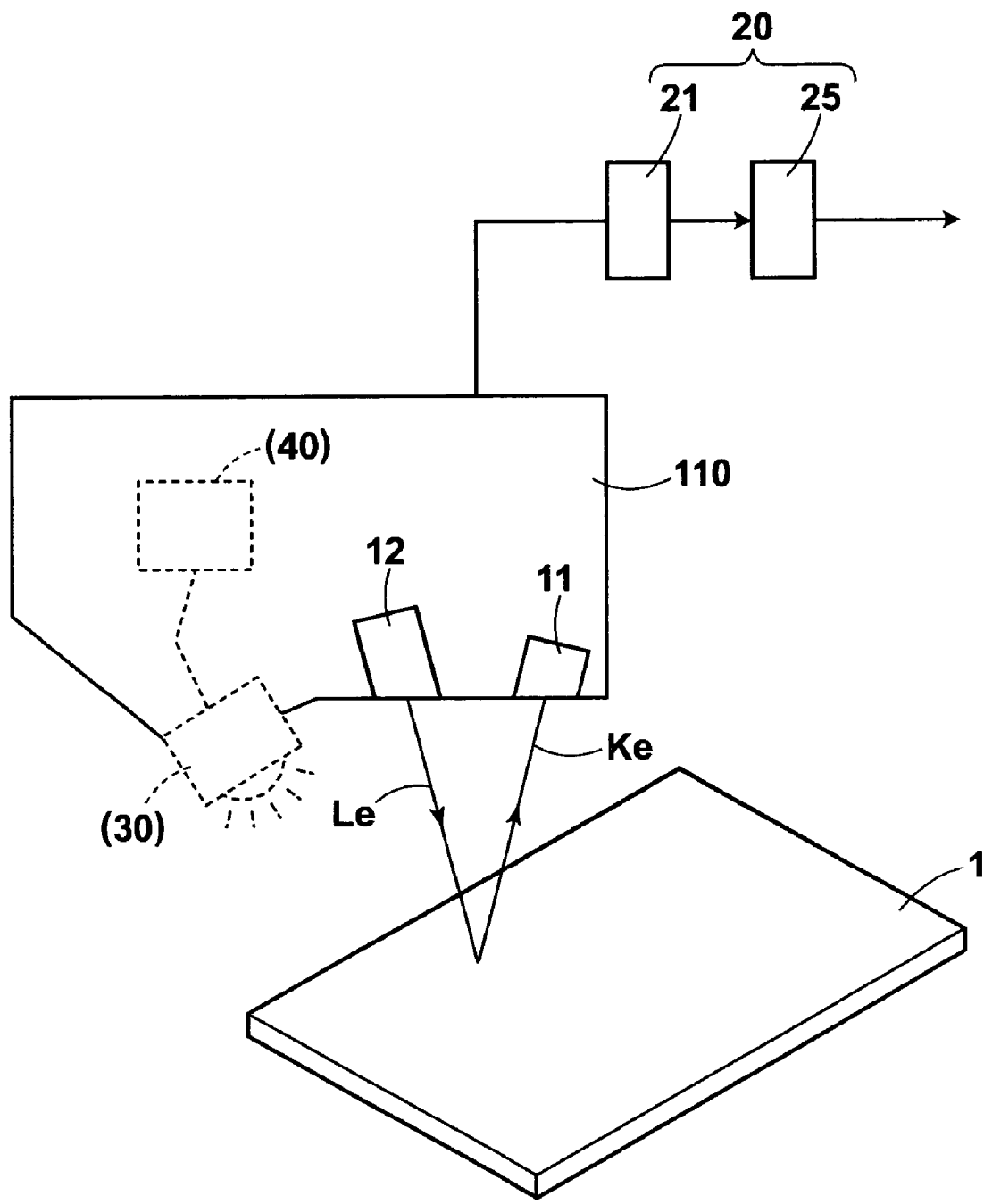
FIG. 6 is a schematic view showing a technique, wherein a plurality of times of image read-out operations are performed on a stimulable phosphor sheet, wherein one read-out image is obtained with each of the image read-out operations, and wherein a plurality of read-out images, which represent an identical radiation image having been stored on the stimulable phosphor sheet, are thereby acquired.

In the embodiment described above, the image read-out operation with the image read-out means 10 for obtaining each of the first read-out image G1 and the second read-out image G2 is performed, such that the efficient pixel existence range of the efficient pixels on the stimulable phosphor sheet 1, which efficient pixels are capable of being read out within the read-out sensitivity range of the image read-out means 10, varies for the first read-out image G1 and the second read-out image G2. In the embodiment described above, in order for the image read-out operation to be performed in the manner described above, the plurality of times of the image read-out operations are performed on the stimulable phosphor sheet 1 by use of the image read-out means 10, and one read-out image is obtained with each of the image read-out operations. In this manner, the plurality of the read-out images G1 and G2, which represent the identical radiation image having been stored on the stimulable phosphor sheet 1, are obtained. In the embodiment described above, in such cases, the technique is employed wherein, instead of the read-out sensitivity range of the image read-out means 10 being altered in each of the image read-out operations, the radiation energy having been stored on the stimulable phosphor sheet 1 is decayed uniformly at a stage between the image read-out operations, and wherein the next image read-out operation is performed with the image read-out means 10 after the uniform decaying of the radiation energy. Alternatively, as illustrated in FIG. 6, it is possible to employ a technique wherein, instead of the uniform decaying of the radiation energy at the stage between the image read-out operations being performed on the stimulable phosphor sheet 1 by use of the radiation energy decaying means 30 and the control means 40, the read-out sensitivity range of a detecting section 11 of image read-out means 110 is altered for each of the image read-out operations. As another alternative, it is possible to employ a technique, wherein the intensity of the stimulating rays Le, which are irradiated from stimulating ray irradiating means 12 to the stimulable phosphor sheet 1, is altered for each of the image read-out operations. In such cases, the radiation image acquiring apparatus need not be provided with the radiation energy decaying means 30 and the control means 40.

As a further alternative, the quantity of the stimulating rays Le, which are irradiated from the stimulating ray irradiating means 12 to the stimulable phosphor sheet 1, may be set to be large. Specifically, the stimulable phosphor sheet 1 may be caused to emit the emitted light Ke by the irradiation of the stimulating rays Le and, at the same time, at least a predetermined quantity of the radiation energy having been stored on the stimulable phosphor sheet 1 may be caused to decay uniformly. In this manner, the image read-out operations for obtaining the plurality of the read-out images may be performed such that the efficient pixel existence range of the efficient pixels on the stimulable phosphor sheet 1, which efficient pixels are capable of being read out within the read-out sensitivity range of the detecting section 11 of the image read-out means 110, varies for different read-out images. In such cases, the radiation image acquiring apparatus need not be provided with the radiation energy decaying means 30 and the control means 40.

Figure 7:
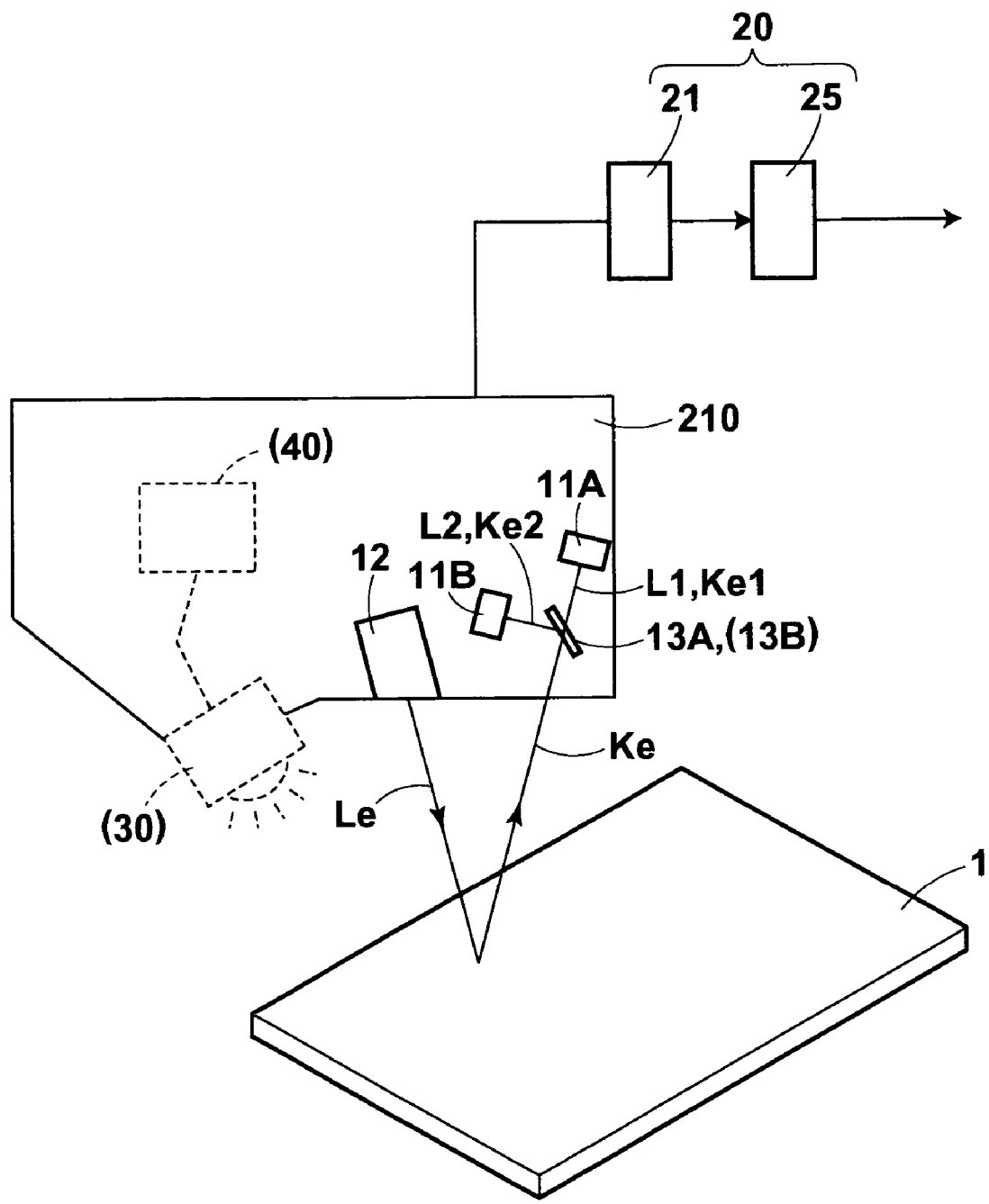
FIG. 7 is a schematic view showing a technique, wherein a plurality of read-out images, which represent an identical radiation image having been stored on a stimulable phosphor sheet, are acquired with only one time of an image read-out operation performed on the stimulable phosphor sheet.

Furthermore, as illustrated in FIG. 7, the direction of the optical path of the emitted light Ke, which has been emitted from an identical site on the stimulable phosphor sheet 1 when the stimulating rays Le are irradiated to the stimulable phosphor sheet 1, may be branched into an optical path L1 and an optical path L2. Also, one read-out image may be acquired with each of a detecting section 11A, which is located with respect to the optical path L1, and a detecting section 11B, which is located with respect to the optical path L2. In this manner, the plurality of the read-out images, which represent the identical radiation image having been stored on the stimulable phosphor sheet 1, may be obtained with only one time of the image read-out operation performed by image read-out means 210. A composite image may then be formed by use of the read-out images.

Specifically, as illustrated in FIG. 7, a beam splitter 13A for splitting an incident light beam into light beams having an identical optical intensity may be employed. The emitted light Ke, which has been emitted from an identical site on the stimulable phosphor sheet 1 when the stimulating rays Le are irradiated from the stimulating ray irradiating means 12 to the stimulable phosphor sheet 1, may thus be split by the beam splitter 13A into emitted light Ke1 and emitted light Ke2, which have an identical optical intensity. The emitted light Ke1 travels along the optical path L1, and the emitted light Ke2 travels along the optical path L2. Also, the emitted light Ke1 and the emitted light Ke2 may be detected respectively by the detecting section 11A and the detecting section 11B, which have been set so as to have different read-out sensitivity ranges.

Alternatively, a beam splitter 13B for splitting an incident light beam into light beams having different optical intensities may be employed. The emitted light Ke, which has been emitted from an identical site on the stimulable phosphor sheet 1 when the stimulating rays Le are irradiated from the stimulating ray irradiating means 12 to the stimulable phosphor sheet 1, may thus be split by the beam splitter 13B into the emitted light Ke1 and the emitted light Ke2, which have different optical intensities. The emitted light Ke1 travels along the optical path L1, and the emitted light Ke2 travels along the optical path L2. Also, the emitted light Ke1 and the emitted light Ke2 may be detected respectively by the detecting section 11A and the detecting section 11B, which have been set so as to have an identical read-out sensitivity range.

In the manner described above, the plurality of the read-out images, which represent the identical radiation image having been stored on the stimulable phosphor sheet 1, are capable of being acquired with the image read-out means 210 illustrated in FIG. 7, in which the beam splitter 13A or the beam splitter 13B is utilized. In such cases, the radiation image acquiring apparatus need not be provided with the radiation energy decaying means 30 and the control means 40.

Figure 8A:
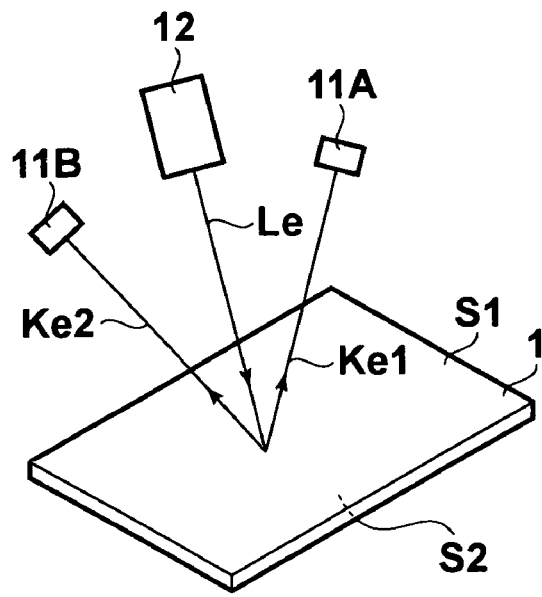
FIG. 8A is a schematic view showing a different technique, wherein a plurality of read-out images, which represent an identical radiation image having been stored on a stimulable phosphor sheet, are acquired with only one time of an image read-out operation performed on the stimulable phosphor sheet.
Figure 8B:
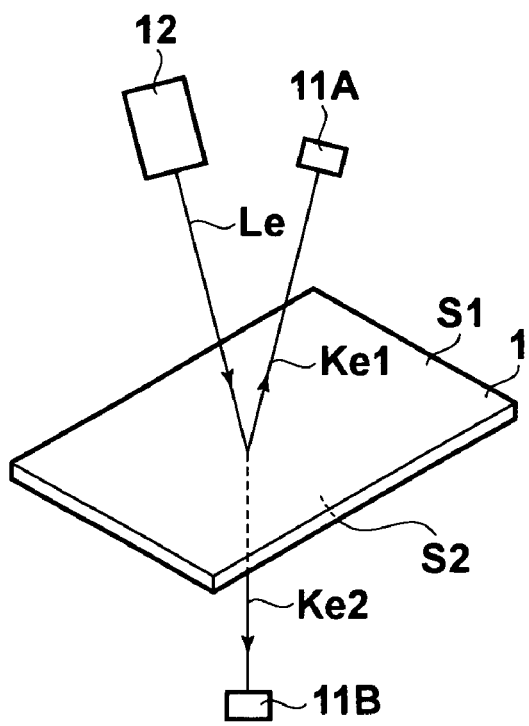
FIG. 8B is a schematic view showing a further different technique, wherein a plurality of read-out images, which represent an identical radiation image having been stored on a stimulable phosphor sheet, are acquired with only one time of an image read-out operation performed on the stimulable phosphor sheet.

Also, as illustrated in FIG. 8A, the emitted light Ke1 and the emitted light Ke2, which have been emitted from an identical site on the stimulable phosphor sheet 1 toward different directions on the side of one surface S1 of the stimulable phosphor sheet 1 when the stimulating rays Le are irradiated from the stimulating ray irradiating means 12 to the stimulable phosphor sheet 1, may be detected respectively by the detecting section 11A and the detecting section 11B, which are located on the side of the one surface S1 of the stimulable phosphor sheet 1. Alternatively, as illustrated in FIG. 8B, the emitted light Ke1, which has been emitted from an identical site on the stimulable phosphor sheet 1 toward the side of one surface S1 of the stimulable phosphor sheet 1 when the stimulating rays Le are irradiated from the stimulating ray irradiating means 12 to the stimulable phosphor sheet 1, and the emitted light Ke2, which has been emitted from the identical site on the stimulable phosphor sheet 1 toward the side of the other surface S2 of the stimulable phosphor sheet 1 when the stimulating rays Le are irradiated from the stimulating ray irradiating means 12 to the stimulable phosphor sheet 1, may be detected respectively by the detecting section 11A and the detecting section 11B, which are located respectively on the side of the one surface S1 of the stimulable phosphor sheet 1 and on the side of the other surface S2 of the stimulable phosphor sheet 1. In cases where each of the techniques illustrated in FIG. 8A and FIG. 8B is employed, as in the cases of various techniques described above, the efficient pixel existence range is capable of being set so as to vary for the different read-out images by the adjustment of the optical intensities of the emitted light Ke1 and the emitted light Ke2, which are received respectively by the detecting section 11A and the detecting section 11B, or the adjustment of the read-out sensitivity range of each of the detecting section 11A and the detecting section 11B. In this manner, the plurality of the read-out images, which represent the identical radiation image having been stored on the stimulable phosphor sheet 1, are capable of being obtained, and one composite image is capable of being formed by use of the read-out images. In the cases of the technique illustrated in FIG. 8A or FIG. 8B, the radiation image acquiring apparatus need not be provided with the radiation energy decaying means 30 and the control means 40 described above.

Two or more of the aforesaid techniques for performing the image read-out operation may be employed in combination.

Each of the pixel values described above is the value obtained from an operation, wherein a value of an analog image signal representing the optical intensity of the light emitted by the stimulable phosphor sheet 1, which analog image signal has been detected with 1,024 levels per figure, is converted through a logarithmic amplifier and an analog-to-digital converter into a digital value. Therefore, in cases where the coordinate axis representing the pixel values is employed so as to correspond to the optical intensity of the light emitted by the stimulable phosphor sheet 1, the coordinate axis should preferably be the coordinate axis having a logarithmic scale.

The radiation image acquiring method in accordance with the present invention, which is performed by each of the embodiments described above, may be furnished as a computer program for causing a computer to execute the radiation image acquiring method in accordance with the present invention.

Each of the radiation image acquiring method, the radiation image acquiring apparatus, and the computer program in accordance with the present invention may be utilized in a medical radiation treatment system for performing medical treatment through the irradiation of radiation to a diseased part. Also, high-energy radiation carrying image information of the diseased part may be irradiated to the stimulable phosphor sheet, and a radiation image of the diseased part may thereby be stored on the stimulable phosphor sheet. The read-out images, which represent the identical radiation image of the diseased part having been stored on the stimulable phosphor sheet, may then be obtained. In such cases, since the high-energy radiation carrying the image information of the diseased part is irradiated to the stimulable phosphor sheet, the dynamic range of the radiation image having been stored on the stimulable phosphor sheet becomes markedly wide. Therefore, in cases where each of the radiation image acquiring method, the radiation image acquiring apparatus, and the computer program in accordance with the present invention is utilized in the medical radiation treatment system described above, marked effects of acquiring the composite image, which represents the radiation image having been stored on the stimulable phosphor sheet and has good image quality, are capable of being obtained.

What is claimed is:

1. A radiation image acquiring method, wherein composition processing is performed on a plurality of read-out images, each of which has been obtained from an image read-out operation performed by image read-out means for reading out an identical radiation image having been stored on a stimulable phosphor sheet, and wherein a single composite image, which represents the radiation image having been stored on the stimulable phosphor sheet, is thereby acquired, the method comprising the steps of:

i) performing the image read-out operation with the image read-out means for obtaining each of the read-out images, such that an efficient pixel existence range of efficient pixels, which are capable of being read out within a read-out sensitivity range of the image read-out means, varies for different read-out images, and such that the efficient pixel existence range in each of the read-out images contains an overlapping area, which overlaps with the efficient pixel existence range in one of the other read-out images, ii) performing correction processing on the read-out images, which have the common overlapping area, for correcting pixel values of pixels in at least either one of the read-out images, such that the pixel values of the pixels in the overlapping area of one of the read-out images become identical with the pixel values of the pixels in the overlapping area of the other read-out image, and iii) performing the composition processing for composing a single image from the read-out images, which have been obtained from the correction processing, whereby the composite image is acquired.

2. The radiation image acquiring method as defined in claim 1, wherein the acquired composite image represents the radiation image having been stored on the stimulable phosphor sheet and is recorded on a recordable medium.

3. A computer-readable medium storing a computer program for causing a computer to execute a radiation image acquiring method, wherein composition processing is performed on a plurality of read-out images, each of which has been obtained from an image read-out operation performed by image read-out means for reading out an identical radiation image having been stored on a stimulable phosphor sheet, and wherein a single composite image, which represents the radiation image having been stored on the stimulable phosphor sheet, is thereby formed, the computer program comprising:

i) performing the image read-out operation with the image read-out means for obtaining each of the read-out images of the plurality of read-out images, such that an efficient pixel existence range of efficient pixels, which are capable of being read out within a read-out sensitivity range of the image read-out means, varies for different read-out images, and such that the efficient pixel existence range in each of the read-out images of the plurality of read-out images contains an overlapping area, which overlaps with the efficient pixel existence range in one of the other read-out images of the plurality of read-out images, ii) performing correction processing on the plurality of read-out images, which have the common overlapping area, for correcting pixel values of pixels in at least one of the read-out images of the plurality of read-out images, such that the pixel values of the pixels in the overlapping area of one of the read-out images of the plurality of read-out images become identical with the pixel values of the pixels in the overlapping area of one of the other read-out images of the plurality of read-out images, and iii) performing the composition processing for composing a single image from the plurality of read-out images, which have been obtained from the correction processing, whereby the composite image is formed.

* * * * *